US010089747B2

(12) United States Patent
Wang et al.

(10) Patent No.: US 10,089,747 B2
(45) Date of Patent: Oct. 2, 2018

(54) IMAGE PROCESSING METHOD AND APPARATUS FOR X-RAY IMAGING DEVICE

(71) Applicant: General Electric Company, Schenectady, NY (US)

(72) Inventors: Dejun Wang, Beijing (CN); Yanling Qu, Beijing (CN)

(73) Assignee: General Electric Company, Schenectady, NY (US)

( * ) Notice: Subject to any disclaimer, the term of this patent is extended or adjusted under 35 U.S.C. 154(b) by 104 days.

(21) Appl. No.: 15/381,510

(22) Filed: Dec. 16, 2016

(65) Prior Publication Data
US 2018/0061067 A1 Mar. 1, 2018

(30) Foreign Application Priority Data

Aug. 31, 2016 (CN) .......................... 2016 1 0786944

(51) Int. Cl.
| | |
|---|---|
| *G06T 7/35* | (2017.01) |
| *G06T 7/70* | (2017.01) |
| *G06K 9/62* | (2006.01) |
| *G06K 9/66* | (2006.01) |

(52) U.S. Cl.
CPC .............. *G06T 7/35* (2017.01); *G06K 9/6269* (2013.01); *G06K 9/66* (2013.01); *G06T 7/70* (2017.01); *G06T 2207/10116* (2013.01)

(58) Field of Classification Search
CPC ................... G06K 9/6269; G06K 9/66; G06T 2207/10116; G06T 7/35; G06T 7/70
See application file for complete search history.

(56) References Cited

U.S. PATENT DOCUMENTS

| | | |
|---|---|---|
| 5,495,540 A | 2/1996 | Frankot et al. |
| 6,944,265 B2 | 9/2005 | Warp et al. |
| 7,177,455 B2 | 2/2007 | Warp et al. |
| 2010/0036302 A1 | 2/2010 | Shimada et al. |
| 2011/0262016 A1 | 10/2011 | Shekhar et al. |
| 2011/0305313 A1* | 12/2011 | Sklansky ............. A61B 6/0414 378/37 |

(Continued)

OTHER PUBLICATIONS

Combined Search and Examination Report issued in connection with corresponding GB Application No. 1621250.8 dated Jun. 9, 2017.

*Primary Examiner* — Siamak Harandi
(74) *Attorney, Agent, or Firm* — GE Global Patent Operation; Marc A. Vivenzio

(57) ABSTRACT

This disclosure presents an image processing method and related X-ray imaging device The method comprises: calculating a relative displacement between two first images that are already in auto registration as a first displacement vector; calculating a difference between position information fed back by a position sensor on the X-ray imaging device when imaging exposure is performed on the two first images respectively as a second displacement vector; calculating a first error of the first displacement vector relative to the second displacement vector; calculating a registration level corresponding to the first error in accordance with a pre-stored training model which is a mathematical distribution model of second errors between a plurality of third displacement vectors and a plurality of corresponding fourth displacement vectors; and labeling the registration level on the two first images that are already in auto registration.

18 Claims, 4 Drawing Sheets

(56) References Cited

U.S. PATENT DOCUMENTS

| | | |
|---|---|---|
| 2012/0207359 A1 | 8/2012 | Konukoglu et al. |
| 2013/0162803 A1 | 6/2013 | Steckhan et al. |
| 2016/0140691 A1 | 5/2016 | Munzenmayer et al. |
| 2016/0180527 A1 | 6/2016 | Endo et al. |

* cited by examiner

![US 10,089,747 B2]

IMAGE PROCESSING METHOD AND APPARATUS FOR X-RAY IMAGING DEVICE

FIELD

The exemplary non-limiting embodiments presented herein relate generally to the X-ray imaging field, particularly to an image processing method and apparatus for X-ray imaging device.

BACKGROUND

In an X-ray imaging system of a medical X-ray machine, for example, an imaging range will be limited by a size of an X-ray detector, and often cannot present the needed information of object on the same image. Therefore, the prior art proposes an image stitching technology, by which an image of larger field of view may be obtained, so as to satisfy the imaging requirement.

However, the existing image stitching technology has some problems in practical operation. For example, the existing image stitching technology needs to depend on the doctor's personal experience too much to judge whether there is any stitching error and determine the specific position on which the error exists. Such method cannot ensure accuracy of image stitching. In addition, the judgment via the doctor's personal experience will also cost greater time and effort, reducing working efficiency.

SUMMARY

The exemplary non-limiting embodiments of the present invention described herein provide, in at least one aspect, at least a new image processing method and apparatus for an X-ray imaging device which overcome the aforementioned problems with existing image stitching technology.

Said embodiments, in at least one aspect, provide an image processing method and apparatus for an X-ray imaging device that can improve accuracy of image registration and stitching and help the doctor/clinician to improve working efficiency Exemplary non-limiting embodiments of the present invention provide an image processing method for an X-ray imaging device, comprising the following steps:

calculating a relative displacement between two first images that are already in auto registration as a first displacement vector;

calculating a difference between position information fed back by a position sensor on the above X-ray imaging device when imaging exposure is performed on the above two first images respectively as a second displacement vector;

calculating a first error of the above first displacement vector relative to the above second displacement vector;

calculating a registration level corresponding to the above first error in accordance with a pre-stored training model, the above registration level representing a degree of accuracy of the above auto registration performed on the above two first images, wherein the above training model is: a mathematical distribution model of second errors between a plurality of third displacement vectors and a plurality of corresponding fourth displacement vectors; each third displacement vector representing a displacement vector between two registered second images that is recorded in one image registration; each fourth displacement vector representing a difference between position information fed back by a position sensor on the above X-ray imaging device when imaging exposure is performed on the above corresponding two second images respectively; and labeling the above registration level on the above two first images that are already in auto registration.

Exemplary non-limiting embodiments of the present invention also provide an image processing apparatus for an X-ray imaging device, comprising a first displacement vector acquisition module, a second displacement vector acquisition module, an error calculation module, a registration level calculation module and a labeling module.

The first displacement vector acquisition module is used for acquiring a first displacement vector according to a relative displacement between two first images that are already in auto registration;

the second displacement vector acquisition module is used for reading a second displacement vector from a position sensor of the above X-ray imaging device;

the error calculation module is used for calculating a first error of the above first displacement vector relative to the above second displacement vector;

the registration level calculation module is used for calculating a registration level corresponding to the above first error in accordance with a pre-stored training model, the above registration level representing a degree of accuracy of the auto registration performed on the above two first images, wherein the training model is: a mathematical distribution model of second errors between a plurality of third displacement vectors and a plurality of corresponding fourth displacement vectors; each third displacement vector representing a displacement vector between two registered second images that is recorded in one image registration; each fourth displacement vector representing a difference between position information fed back by a position sensor on the above X-ray imaging device when imaging exposure is performed on the above corresponding two second images respectively; and the labeling module is used for labeling the registration level on the above two first images that are already in registration.

Other features and aspects will be apparent through the following detailed description, figures and claims.

BRIEF DESCRIPTION OF THE DRAWINGS

The exemplary non-limiting embodiments presented herein can be understood better in light of the description of said embodiments with reference to the accompanying drawings, in which.

DETAILED DESCRIPTION

Hereafter, a detailed description will be given for preferred embodiments of the present disclosure. It should be pointed out that in the detailed description of the embodiments, for simplicity and conciseness, it is impossible for the Description to describe all the features of the practical embodiments in details. It should be understood that in the process of a practical implementation of any embodiment, just as in the process of an engineering project or a designing project, in order to achieve a specific goal of the developer and in order to satisfy some system-related or business-related constraints, a variety of decisions will usually be made, which will also be varied from one embodiment to another. In addition, it can also be understood that although the effort made in such developing process may be complex and time-consuming, some variations such as design, manufacture and production on the basis of the technical contents disclosed in the disclosure are just customary technical means in the art for one of ordinary skilled in the art associated with the contents disclosed in the present disclosure, which should not be regarded as insufficient disclosure of the present disclosure.

Unless defined otherwise, all the technical or scientific terms used in the Claims and the Description should have the same meanings as commonly understood by one of ordinary skilled in the art to which the present disclosure belongs. The terms "first", "second" and the like in the Description and the Claims of the present application do not mean any sequential order, number or importance, but are only used for distinguishing different components. The terms "a", "an" and the like do not denote a limitation of quantity, but denote the existence of at least one. The terms "comprises", "comprising", "includes", "including" and the like mean that the element or object in front of the "comprises", "comprising", "includes" and "including" covers the elements or objects and their equivalents illustrated following the "comprises", "comprising", "includes" and "including", but do not exclude other elements or objects. The term "coupled" or "connected" or the like is not limited to being connected physically or mechanically, nor limited to being connected directly or indirectly.

Figure 1:
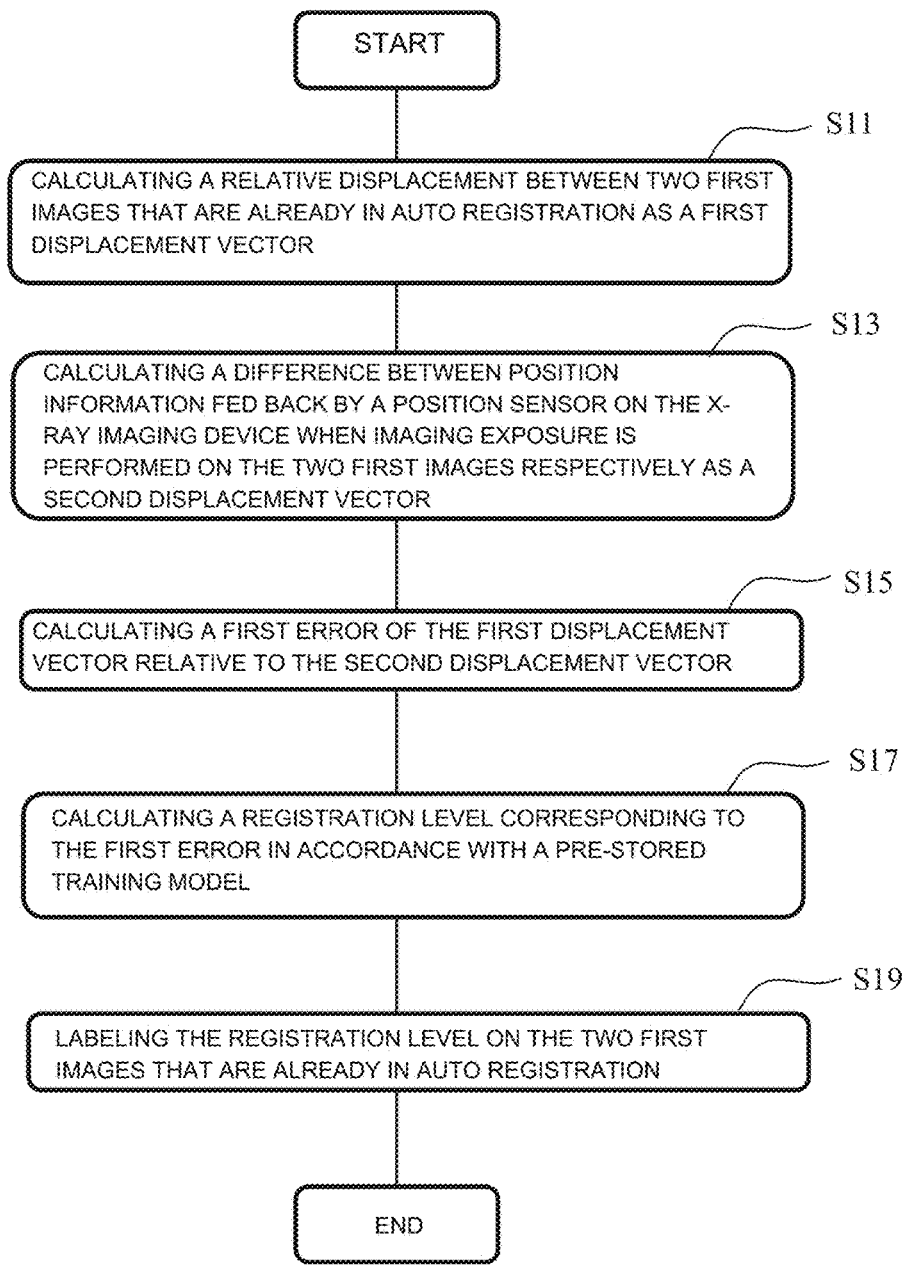
FIG. 1 is a flow chart of an image processing method for an X-ray imaging device according to at least one non-limiting embodiment.
Figure 2:
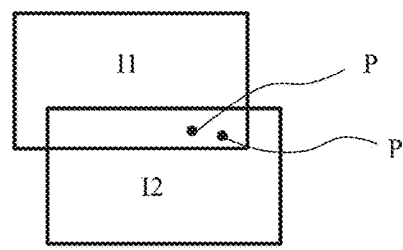
FIG. 2 is a schematic diagram of performing image stitching according to the image processing method in FIG. 1.

FIG. 1 is a flow chart of an image processing method for an X-ray imaging device provided by an exemplary non-limiting embodiment, and FIG. 2 is a schematic diagram of performing image stitching according to the image processing method in FIG. 1. As shown in FIG. 1, the method comprises a first displacement vector acquisition step S11, a second displacement vector acquisition step S13, an error acquisition step S15, a registration level determination step S17 and a labeling step S19.

As shown in FIG. 1 and FIG. 2, the first displacement vector acquisition step S11 may comprise: calculating a relative displacement between two first images I1, I2 that are already in auto registration as a first displacement vector V1.

The above two first images I1, I2 may be: images acquired after two continuous X-ray exposures, e.g., which may be images of adjacent parts of a detected object that are acquired after performing two continuous exposures during rotation of an X-ray bulb, or two images generated continuously during moving of an X-ray detector. There may be an overlapping region with a predetermined width between the two first images I1, I2.

The above "auto registration" may be a registration performed on the first images I1, I2 by anyone of image registration technologies that are currently public or in secret, or image registration performed on the first images I1, I2 by anyone of unknown technologies.

As shown in FIG. 2, the first image I2 has a relative displacement with respect to the first image I1. The person skilled in the art should understand that the relative displacement may be obtained from the position information of the images in a three-dimensional (3D) coordinate utilizing the existing image registration technology. For example, the relative displacement of the first image I2 with respect to the first image I1 may be obtained by calculating a position difference of the same pixel point P in the first images I1, I2 respectively as a first displacement vector V1, the pixel point P being in the overlapping region of the first images I1, I2. The above first displacement vector V1 may be described by the following manner, for example, (−1, −20), wherein "−1" may be a relative displacement in a horizontal direction (X-axis), and −20 may be a relative displacement in a vertical direction (Y-axis).

The second displacement vector acquisition step S13 may comprise: calculating a difference between position information fed back by a position sensor on the X-ray imaging device when imaging exposure is performed on the two first images I1, I2 respectively as a second displacement vector V2.

The above position sensor may be arranged on the X-ray bulb, and may be used to feed back the position information of the X-ray bulb when performing X-ray exposure; the above position sensor may also be arranged on the X-ray detector, and may be used to feed back the position information of the X-ray detector when receiving the exposed X-rays. The second displacement vector V2 may specifically be described as: for example, (2,0), wherein "2" is a difference of the position information in the horizontal direction (X-axis), and "0" is a difference of the position information in the vertical direction (Y-axis).

The error acquisition step S15 may comprise: calculating a first error E1 of the first displacement vector V1 relative to the above second displacement vector V2.

Optionally, in the error acquisition step S15, the first error E1 may be acquired by various kinds of methods, for example, a difference between the first displacement vector V1 and the second displacement vector V2 may be used as the first error E1 directly, i.e., E1=V1−V2; a root value of sum of squares of differences of the first displacement vector V1 relative to the second displacement vector V2 in the X-axis and in the Y-axis may be used as the first error E1, i.e., $$E1=\sqrt{(V1-V2)_x^2+(V1-V2)_y^2}$$

The registration level determination step S17 may comprise: calculating a registration level corresponding to the above first error E1 in accordance with a pre-stored training model, the registration level representing a degree of accuracy of the auto registration performed on the above two first images I1, I2. Specifically, the above training model may be: a mathematical distribution model of second errors between a plurality of third displacement vectors and a plurality of corresponding fourth displacement vectors. Each third displacement vector may represent: a displacement vector between two registered second images that is recorded in one image registration; each fourth displacement vector may represent: a difference between position information fed back by a position sensor on the X-ray imaging device when imaging exposure is performed on the corresponding two second images respectively. The above second image may be: an image obtained after two continuous X-ray exposures.

Corresponding to the first error E1, the second error may be a difference between the third displacement vector and the fourth displacement vector, and may also be a root value of sum of squares of differences of the third displacement vector relative to the fourth displacement vector in the X-axis and the in the Y-axis.

In order to build the above training model, for a pair of second images, after image registration performed thereon by a physician (which may be an auto registration operated by the physician, or a manual correction operated by the physician), a displacement vector of the current image (e.g., a second image) relative to the previous image (e.g., a second image) is recorded as a third displacement vector, and a difference between position information when imaging exposure is performed on the pair of second images that is fed back by the position sensor on the X-ray imaging device is acquired as a fourth displacement vector. In this way, by acquiring differences between third displacement vectors and corresponding fourth displacement vectors as second errors in a great number of image registrations, a great number of values of second errors may be obtained, and a mathematical distribution model of such great number of second errors can just be used as the above training model. For example, the mathematical distribution model of second errors may be a Gaussian distribution model as shown in FIG. 3.

Figure 3:
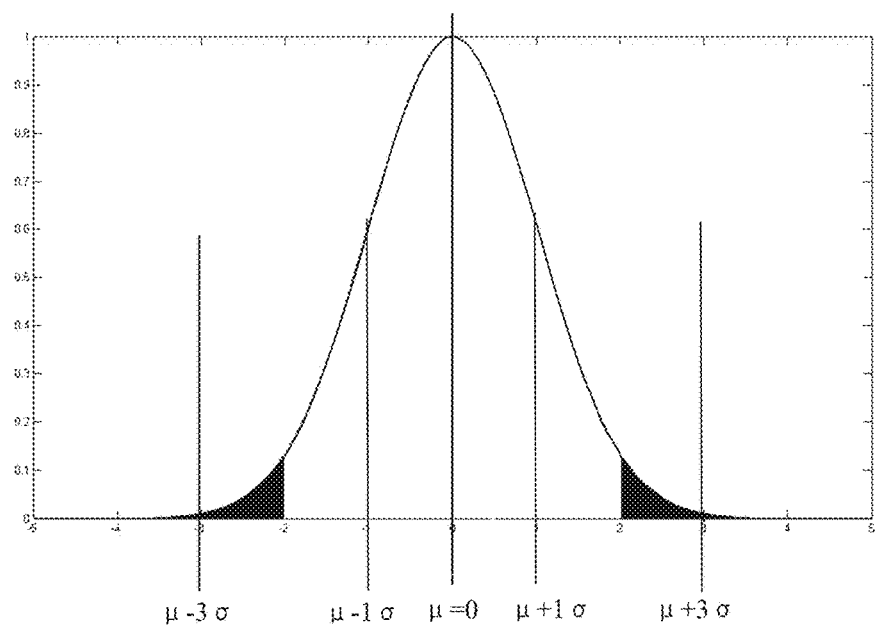
FIG. 3 is a graph showing a training model.

As shown in FIG. 3, the Gaussian distribution model may be described as: $X\sim N(\mu,\sigma2)$, wherein X represents a variable of the second error, $\mu$ is a desired error value, and $\mu$ may be 0 in the present embodiment; $\sigma$ is a standard deviation of the Gaussian distribution model, i.e., Sigma value, which represents a data distribution range of the Gaussian distribution model, i.e., a distribution range of the second errors.

The registration level of the first images I1, I2 may be measured in accordance with the first error E1 related to the first images I1, I2, and a degree that the training model approaches the desired value.

In one embodiment, the above registration level may be a Sigma ($\sigma$) level of a Gaussian distribution model. It is well known that a Sigma level of a Gaussian distribution model can represent a degree that data values in the distribution model approach a center value (average value), with the Sigma level greater, the data values of its distribution approaching the center value more, with the Sigma level less, the data values of its distribution farther away from the center value.

Optionally, in the above registration level determination step S17, the registration level of the auto registration of the two first images I1, I2 may be determined by the following manner:

dividing the first error E1 of the first displacement vector V1 relative to the second displacement vector V2 by the Sigma value ($\sigma$) of the Gaussian distribution model to obtain the Sigma level of the first error E1 in the Gaussian distribution model, for example, using following Equation to calculate said Sigma level:

$$L=(E1-\mu)/\sigma;$$

In the above Equation, L is the Sigma level of the first error E1 in the Gaussian distribution model, $\mu=0$.

The Sigma level of the Gaussian distribution model serves as a multiple of the Sigma value in the Gaussian distribution model, i.e., the above registration level of the two first images I1, I2 that are already in auto registration.

The labeling step S19 may comprise: labeling the above registration level on the two first images I1, I2 that are already in auto registration. As an example, labeling may be performed on the overlapping region of the two first images I1, I2, or may also be performed on the other positions of the display region. As another example, the above registration level may be divided into several ranks that may be indicated in different colors, shapes or symbols. As another example, one or more threshold ranges for a registration level may be set in advance, and labeling may be performed only if the registration level lies in one of the threshold ranges.

Optionally, a step of determining threshold ranges of one or more registration levels may further be included before the step of calculating the first displacement vector S11; the above labeling step S19 may include: adopting the same labeling manner for registration levels within the same threshold range.

Optionally, the above threshold ranges of registration level comprise a first threshold range, a second threshold range and a third threshold range. The degree of accuracy of the auto registration represented by the second threshold range is greater than the degree of accuracy of the auto registration represented by the first threshold range and less than the degree of accuracy of the auto registration represented by the third threshold range.

Figure 4:
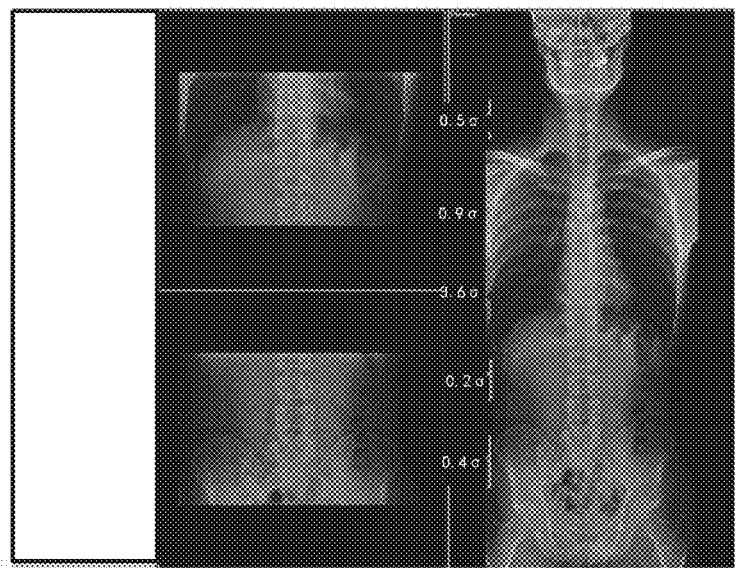
FIG. 4 is a schematic diagram of labeling registration levels on images.

FIG. 4 is a schematic diagram of labeling registration levels on images in an exemplary non-limiting embodiment. As shown in FIG. 4, in the example, at least two thresholds of registration level "1" and "3" and a corresponding first threshold range "less than 1", a corresponding second threshold range "greater than or equal to 1 and less than or equal to 3" and a corresponding third threshold range "greater than 3" may be set; when the obtained Sigma level is greater than 3 (3.6$\sigma$ as shown in FIG. 4), the registration level of the corresponding first images I1, I2 is judged to be unqualified, and labeling is performed in red vertical bars at the overlapping region (registration region) of the corresponding first images I1, I2; when the obtained Sigma level is between 1 and 3, the registration level of the corresponding first images I1, I2 is judged to be qualified, and labeling may be performed in yellow vertical bars; when the obtained Sigma level is less than 1 (0.5$\sigma$, 0.9$\sigma$, 0.2$\sigma$, 0.4$\sigma$ as shown in FIG. 4), the registration level of the corresponding first images I1, I2 is judged to be good, and labeling may be performed in green vertical bars.

By labeling the registration level of the auto registration, the degree of accuracy of the auto registration can be presented intuitively to the physician for reference, facilitating investigation and correction for registration mistake and improving efficiency of the image registration.

From the above description, it can be seen that the first displacement vector V1 and the second displacement vector V2 may include a relative displacement in the horizontal direction and a relative displacement in the vertical direction of the two first images simultaneously. In other embodiments, the first displacement vector V1 and the second displacement vector V2 may also only include a relative displacement in the horizontal direction or a relative displacement in the vertical direction, so as to achieve labeling for the registration level in the horizontal direction or in the vertical direction alone.

Correspondingly, the above mathematical distribution model of second errors also includes a distribution of errors in the horizontal direction, a distribution of errors in the vertical direction or a joint distribution of errors in the horizontal direction and in the vertical direction.

Optionally, in order to update continuously to perfect the above mathematical distribution model of second errors, the image processing method may further comprise the following steps:

after re-registering the two first images I1, I2 that are already in auto registration, using the two first images I1, I2 as the two second images respectively to obtain a relative displacement between the two first images I1, I2 as a new third displacement vector, and using the second displacement vector V2 as a new fourth displacement vector;

adding a second error between the above new third displacement vector and the above new fourth displacement vector into the above training model to adaptively update the training model. Specifically, the newly obtained second error may be added into the raw data of the training model and the standard deviation σ of the training model may be re-calculated.

By continuously adding related parameters of relative displacement vectors between two images that have been accurately registered into the training model as a data distribution of the model so as to perfect the training model, an image registration level may be obtained more accurately in the auto registration of the later stage.

Figure 5:
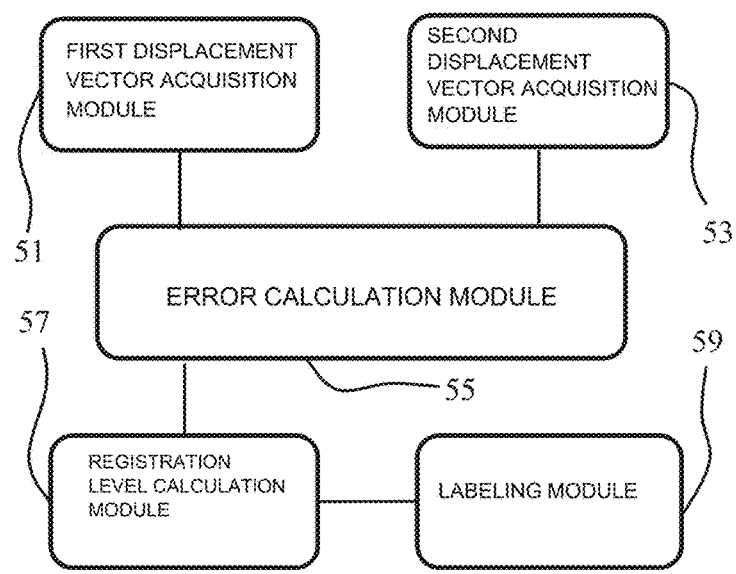
FIG. 5 is a block diagram of an image processing apparatus for an X-ray imaging device according to at least one non-limiting embodiment.

FIG. 5 is a block diagram of an image processing apparatus for an X-ray imaging device provided by an exemplary non-limiting embodiment. As shown in FIG. 5, the apparatus may comprise a first displacement vector acquisition module 51, a second displacement vector acquisition module 53, an error calculation module 55, a registration level calculation module 57 and a labeling module 59.

The first displacement vector acquisition module 51 is used to acquire a first displacement vector V1 according to a relative displacement between two first images I1, I2 that are already in auto registration.

The second displacement vector acquisition module 53 is used to read a second displacement vector V2 from a position sensor of the X-ray imaging device.

The error calculation module 55 is used to calculate a first error E1 of the first displacement vector V1 relative to the second displacement vector V2.

The registration level calculation module 57 is used to calculate a registration level corresponding to the first error E1 in accordance with the above pre-stored training model, the registration level representing a degree of accuracy of the auto registration performed on the two first images I1, I2. Since the training model (Gaussian distribution model) has been described in details in the above statements, it will not be repeated herein.

The labeling module 59 is used to label the registration level on the above two images I1, I2 that are already in registration.

Optionally, the registration level calculation module 57 is used to divide the first error E1 of the first displacement vector V1 relative to the second displacement vector V2 by a Sigma value of the Gaussian distribution model to obtain the Sigma level of the Gaussian distribution model, and the Sigma level of the Gaussian distribution model is the registration level of the two first images I1, I2 that are already in auto registration.

Figure 6:
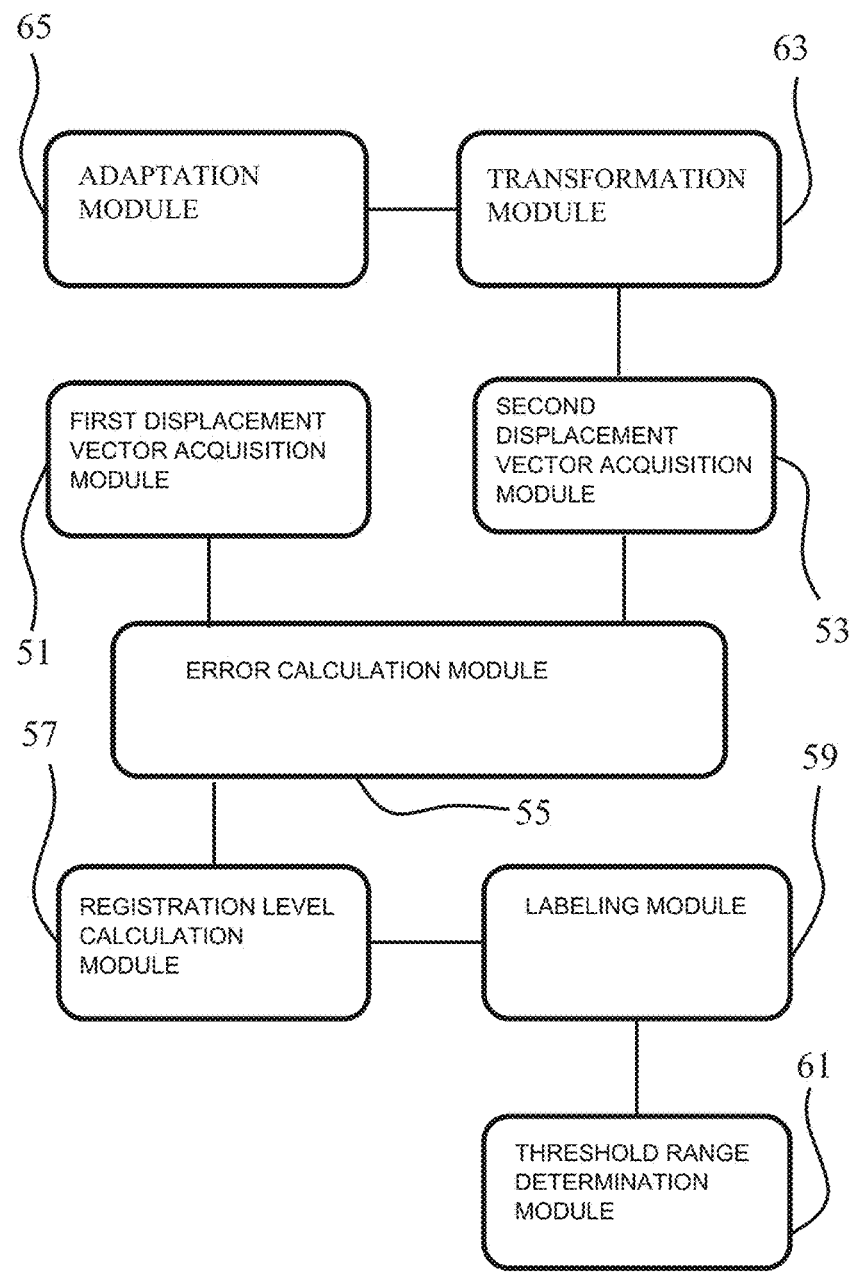
FIG. 6 is a block diagram of an image processing apparatus for an X-ray imaging device according to at least one non-limiting embodiment.

FIG. 6 is a block diagram of an image processing apparatus for an X-ray imaging device provided by another exemplary non-limiting embodiment. As shown in FIG. 6, optionally, the image processing apparatus for the X-ray imaging device(s) described herein may further comprise a threshold range determination module 61.

The threshold range determination module 61 is used to determine threshold ranges of one or more registration levels. The threshold ranges of registration level may comprise a first threshold range, a second threshold range and a third threshold range. The degree of accuracy of the auto registration represented by the second threshold range is less than the degree of accuracy of the auto registration represented by the first threshold range and greater than the degree of accuracy of the auto registration represented by the third threshold range.

The above labeling module 59 is further used to adopt the same labeling manner for registration levels within the same threshold range.

As shown in FIG. 6, optionally, the image processing apparatus for an X-ray imaging device of the exemplary non-limiting embodiments presented herein may further comprise a transformation module 63 and an adaptation module 65.

The transformation module 63 may be configured to: after re-registering the two first images I1, I2 that are already in auto registration, use the two first images I1, I2 as the two second images respectively to obtain a relative displacement between the two first images I1, I2 as a new third displacement vector, and use the second displacement vector as a new fourth displacement vector.

The adaptation module 65 may be configured to: add a second error between the new third displacement vector and the new fourth displacement vector into the training model to adaptively update the training model.

The image processing method and apparatus for an X-ray imaging device of the exemplary non-limiting embodiments presented herein obtain the error between the displacement vector between the images in auto registration and the displacement vector fed back by the sensor, and calculate the registration level corresponding to the currently obtained error according to the built mathematical distribution model of displacement vector errors so as to measure the degree of accuracy of the current image auto registration. By labeling the registration level, the degree of accuracy of the auto registration can be presented intuitively to the physician for reference, facilitating investigation and correction for registration mistake and improving efficiency of the image registration.

Some exemplary embodiments have been described in the above. However, it should be understood that various modifications may be made thereto. For example, if the described techniques are carried out in different orders, and/or if the components in the described system, architecture, apparatus or circuit are combined in different ways and/or replaced or supplemented by additional components or equivalents thereof, proper results may still be achieved. Accordingly, other implementation also falls within a protection range of the Claims.

What is claimed is:

1. An image processing method for an X-ray imaging device, comprising the following steps:
   calculating a relative displacement between two first images that are already in auto registration as a first displacement vector;
   calculating a difference between position information fed back by a position sensor on the X-ray imaging device when imaging exposure is performed on the two first images respectively as a second displacement vector;
   calculating a first error of the first displacement vector relative to the second displacement vector;
   calculating a registration level corresponding to the first error in accordance with a pre-stored training model, the registration level representing a degree of accuracy of the auto registration performed on the two first images, wherein the training model is: a mathematical distribution model of second errors between a plurality of third displacement vectors and a plurality of corresponding fourth displacement vectors; each third displacement vector representing a displacement vector between two registered second images that is recorded in one image registration; each fourth displacement vector representing a difference between position information fed back by a position sensor on the X-ray imaging device when imaging exposure is performed on the corresponding two second images respectively; and labeling the registration level on the two first images that are already in auto registration.

2. The image processing method for an X-ray imaging device according to claim 1, wherein the mathematical distribution model of second errors comprises a distribution of errors in a horizontal direction, a distribution of errors in a vertical direction, or a joint distribution of errors in a horizontal direction and in a vertical direction.

3. The image processing method for an X-ray imaging device according to claim 2, wherein the first error is a difference between the first displacement vector and the second displacement vector, or a root value of sum of squares of differences of the first displacement vector relative to the second displacement vector in a horizontal direction and in a vertical direction; the second error is a difference between the third displacement vector and the fourth displacement vector, or a root value of sum of squares of differences of the third displacement vector relative to the fourth displacement vector in a horizontal direction and in a vertical direction.

4. The image processing method for an X-ray imaging device according to claim 1, wherein the mathematical distribution model is a Gaussian distribution model, and the registration level is a Sigma level of the first error in the Gaussian distribution model.

5. The image processing method for an X-ray imaging device according to claim 4, wherein the Gaussian distribution model is described as: $X \sim N(\mu, \sigma^2)$, wherein X represents a variable of the second error, $\mu$ represents a desired error value, $\sigma$ represents a standard deviation of the Gaussian distribution model, i.e., Sigma value.

6. The image processing method for an X-ray imaging device according to claim 4, wherein calculating a registration level corresponding to the first error in accordance with a pre-stored training model comprises the following steps:

dividing the first error of the first displacement vector relative to the second displacement vector by a Sigma value of the Gaussian distribution model to obtain the Sigma level of the Gaussian distribution model, and the Sigma level of the Gaussian distribution model is the registration level of the two first images that are already in auto registration.

7. The image processing method for an X-ray imaging device according to claim 1, wherein, before the step of calculating the first displacement vector, further comprising the following steps:

determining threshold ranges of one or more registration levels;

the step of "labeling the registration level on the two first images that are already in auto registration" comprises: adopting the same labeling manner for registration levels within the same threshold range.

8. The image processing method for an X-ray imaging device according to claim 7, wherein the threshold ranges of registration levels comprise a first threshold range, a second threshold range and a third threshold range, a degree of accuracy of auto registration represented by the second threshold range being greater than a degree of accuracy of auto registration represented by the first threshold range and less than a degree of accuracy of auto registration represented by the third threshold range.

9. The image processing method for an X-ray imaging device according to claim 1, further comprising the following steps:

after re-registering the two first images that are already in auto registration, using the two first images as the two second images respectively to obtain a relative displacement between the two first images as a new third displacement vector, and using the second displacement vector as a new fourth displacement vector;

adding a second error between the new third displacement vector and the new fourth displacement vector into the training model to adaptively update the training model.

10. An image processing apparatus for an X-ray imaging device, comprising:

a first displacement vector acquisition module for acquiring a first displacement vector according to a relative displacement between two first images that are already in auto registration;

a second displacement vector acquisition module for reading a second displacement vector from a position sensor of the X-ray imaging device;

an error calculation module for calculating a first error of the first displacement vector relative to the second displacement vector;

a registration level calculation module for calculating a registration level corresponding to the first error in accordance with a pre-stored training model, the registration level representing a degree of accuracy of the auto registration performed on the two first images, wherein the training model is: a mathematical distribution model of second errors between a plurality of third displacement vectors and a plurality of corresponding fourth displacement vectors; each third displacement vector representing a displacement vector between two registered second images that is recorded in one image registration; each fourth displacement vector representing a difference between position information fed back by a position sensor on the X-ray imaging device when imaging exposure is performed on the corresponding two second images respectively; and a labeling module for labeling the registration level on the two first images that are already in auto registration.

11. The image processing apparatus for an X-ray imaging device according to claim 10, wherein the mathematical distribution model of the second errors comprises a distribution of errors in a horizontal direction, a distribution of errors in a vertical direction, or a joint distribution of errors in a horizontal direction and in a vertical direction.

12. The image processing apparatus for an X-ray imaging device according to claim 11, wherein the first error is a difference between the first displacement vector and the second displacement vector, or a root value of sum of squares of differences of the first displacement vector relative to the second displacement vector in a horizontal direction and in a vertical direction; the second error is a difference between the third displacement vector and the fourth displacement vector, or a root value of sum of squares of differences of the third displacement vector relative to the fourth displacement vector in a horizontal direction and in a vertical direction.

13. The image processing apparatus for an X-ray imaging device according to claim 10, wherein the mathematical distribution model is a Gaussian distribution model, and the registration level is a Sigma level of the first error in the Gaussian distribution model.

14. The image processing apparatus for an X-ray imaging device according to claim 13, wherein the Gaussian distribution model is described as: $X \sim N(\mu, \sigma^2)$, wherein X represents a variable of the second error, $\mu$ represents a desired error value, $\sigma$ represents a standard deviation of the Gaussian distribution model, i.e., Sigma value.

15. The image processing apparatus for an X-ray imaging device according to claim 13, wherein the registration level calculation module is used to: dividing the first error of the first displacement vector relative to the second displacement vector by a Sigma value of the Gaussian distribution model to obtain the Sigma level of the Gaussian distribution model, and the Sigma level of the Gaussian distribution model is the registration level of the two first images that are already in auto registration.

16. The image processing apparatus for an X-ray imaging device according to claim 10, further comprising:
   a threshold range determination module for determining threshold ranges of one or more registration levels;
   the labeling module is further used to: adopting the same labeling manner for registration levels within the same threshold range.

17. The image processing apparatus for an X-ray imaging device according to claim 16, wherein the threshold ranges of registration levels comprise a first threshold range, a second threshold range and a third threshold range, a degree of accuracy of auto registration represented by the second threshold range being greater than a degree of accuracy of auto registration represented by the first threshold range and less than a degree of accuracy of auto registration represented by the third threshold range.

18. The image processing apparatus for an X-ray imaging device according to claim 10, further comprising:
   a transformation module for using the two first images as the two second images respectively to obtain a relative displacement between the two first images as a new third displacement vector and using the second displacement vector as a new fourth displacement vector, after re-registering the two first images that are already in auto registration;
   an adaptation module for adding a second error between the new third displacement vector and the new fourth displacement vector into the training model to adaptively update the training model.

* * * * *